(12) United States Patent
Kajitani et al.

(10) Patent No.: US 8,003,266 B2
(45) Date of Patent: Aug. 23, 2011

(54) FUEL CELL AND METHOD OF OPERATING SAME

(75) Inventors: Hiroshi Kajitani, Tokyo (JP); Hidekazu Kimura, Tokyo (JP); Takashi Manako, Tokyo (JP); Tsutomu Yoshitake, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 1205 days.

(21) Appl. No.: 10/578,097

(22) PCT Filed: Nov. 8, 2004

(86) PCT No.: PCT/JP2004/016525
§ 371 (c)(1),
(2), (4) Date: May 3, 2006

(87) PCT Pub. No.: WO2005/045972
PCT Pub. Date: May 19, 2005

(65) Prior Publication Data
US 2007/0134534 A1    Jun. 14, 2007

(30) Foreign Application Priority Data
Nov. 6, 2003    (JP) .................................. 2003-377084

(51) Int. Cl.
*H01M 8/04*    (2006.01)

(52) U.S. Cl. .......................................... 429/414; 95/107
(58) Field of Classification Search .................... 429/12, 429/32–29, 414; 95/107
See application file for complete search history.

(56) References Cited

U.S. PATENT DOCUMENTS
5,432,023 A * 7/1995 Yamada et al. ............... 429/442
2004/0229093 A1* 11/2004 Nakanishi et al. ............ 429/19

FOREIGN PATENT DOCUMENTS
JP    6-52878      2/1994
JP    6-188008     7/1994
JP    2004-259569  9/2004

* cited by examiner

*Primary Examiner* — Ula C Ruddock
*Assistant Examiner* — Stephen Yanchuk
(74) *Attorney, Agent, or Firm* — Young & Thompson

(57) ABSTRACT

A fuel cell is provided which can supply the stable power and has higher reliability and a longer period of life without the influence of the circumstances and the operation conditions. An absorbent disposed near an oxidant electrode of a fuel cell including a fuel electrode and the oxidant electrode approaches to the vicinity of or is in contact with the oxidant electrode surface or departs from the oxidant electrode. Thereby, the absorbent removes moisture on the oxidant electrode so that the fuel cell which can supply the stable power with the higher reliability and the longer period of life can be provided.

22 Claims, 8 Drawing Sheets

FUEL CELL AND METHOD OF OPERATING SAME

TECHNICAL FIELD

The present invention relates to a fuel cell and a method of operating the same.

BACKGROUND ART

With the advent of the recent information society, the amount of information processed in an electronic device such as a personal computer is surprisingly increased with the significant increase of power consumption of the electronic device. Especially, in the portable electronic devices, a problem regarding the increase of the power consumption accompanied with the increase of processing capacity arises. While a lithium ion secondary battery is generally used as a power source in these portable electronic devices at present, the energy density of the lithium ion secondary battery approaches to its limit.

In order to extend a continuously usable period of the portable electronic devices, the reduction of the power consumption is required by suppressing the drive frequency of CPU.

Under the above circumstance, the significant extension of the continuously usable period of the portable electronic devices is expected by using a fuel cell having a larger energy density in place of the lithium secondary battery as their power sources.

A fuel cell configured by a fuel electrode and an oxidant electrode sandwiching an electrolyte generates power in accordance with an electrochemical reaction while fuel is supplied to the fuel electrode and an oxidant is supplied to the oxidant electrode. While hydrogen is generally used as the fuel, an improved fuel cell in which methanol usable as an inexpensive and easy-handling raw material is modified to generate hydrogen, and a direct-type fuel cell directly using the methanol as the fuel are extensively developed in the recent years.

The reaction on the fuel electrode in which the hydrogen is used as the fuel proceeds in accordance with a formula (1).

$$3H_2 \rightarrow 6H^+ + 6e^- \quad (1)$$

The reaction on the fuel electrode in which the methanol is used as the fuel proceeds in accordance with a formula (2).

$$CH_3OH + H_2O \rightarrow 6H^+ + CO_2 + 6e^- \quad (2)$$

In either case, the reaction on the oxidant electrode proceeds in accordance with a formula (3).

$$\tfrac{3}{2}O_2 + 6H^+ + 6e^- \rightarrow 3H_2O \quad (3)$$

The fuel cell is classified into many kinds, and is broadly divided into an alkali type, a solid polymer type, a phosphoric acid type, a melt carbonate type and a solid electrolyte type.

JP-A-6(1994)-52878 discloses a phosphoric acid type fuel cell accommodated in a sealed vessel in which hydrogen acting as fuel is reacted with oxygen in air to generate power. In the sealed vessel, the oxygen in air is taken in and the reacted gas is discharged from the vessel during the operation of the fuel cell. An absorbent reproducible by heating is disposed in the sealed vessel. The phosphoric acid type fuel cell described in the publication solves a problem that generated moisture dropping in the sealed vessel reduces the phosphoric acid concentration to deteriorate the cell characteristics.

DISCLOSURE OF INVENTION

Problems to be Solved by Invention

A problem also arises in the solid electrolyte type fuel cell that when moisture remains in the surface of the oxidant electrode after a longer period of operation, the reduction of the power generation due to the decrease of the gas permeation of electrodes and the reduction of the output due to the decrease of the effective catalyst surface take place.

Another problem arises that when the temperature of the fuel cell falls due to the temperature change around the fuel cell, the temperature in an oxidant path rises to collect water around the oxidant electrode depending on the conditions so that the effective take-in of the oxidant cannot be attained to lower the generation efficiency. When the water is left, it is condensed and frozen at a lower temperature.

A configuration is required in this case that the moisture on the oxidant electrode surface is removed and the oxidant is efficiently supplied to the oxidant electrode during the operation of the fuel cell.

The present invention has been made in view of the above circumstances. An object thereof is to provide a fuel cell in which the stable power can be supplied without the influence of the circumstances and the operation conditions. Another object of the present invention is to provide the fuel cell having higher reliability and a longer period of life.

Means for Solving Problems

In accordance with the present invention, a fuel cell is provided which includes a fuel electrode and an oxidant electrode, an absorbent disposed on the oxidant electrode side; and an absorbent moving part movably supporting the absorbent in a direction that the absorbent approaches to and departs from the oxidant electrode.

The fuel cell can further include a solid electrolyte membrane sandwiched by the fuel electrode and the oxidant electrode. In this configuration, even if the moisture is deposited on the oxidant electrode, the moisture can be efficiently removed by moving the absorbent in the direction that the absorbent approaches to the oxidant electrode, and further the fuel cell can be operated as usual moving the absorbent in the direction that the absorbent departs from the oxidant electrode. In this manner, the fuel cell can be stably operated without the influence of the circumstances and the operation conditions.

The absorbent moving part can move the absorbent between a position where at least a part of the absorbent is in contact with the oxidant electrode and another position where at least the part of the absorbent is departed from the oxidant electrode.

Thereby, the moisture deposited on the oxidant electrode can be efficiently removed. Further, when the absorbent moves to the position where the absorbent is separated from the oxidant electrode, the fuel cell can be operated as usual. Accordingly, the power generation efficiency of the fuel cell can be increased.

The absorbent can include a plane, and the absorbent can be supported such that the plane opposes to the surface of the oxidant electrode when the absorbent moving part moves in the direction where the absorbent approaches to the oxidant electrode in the fuel cell of the present invention. The plane of the absorbent preferably has a surface area larger than that of the oxidant electrode. Thereby, the absorbent in contact with the surface of the oxidant electrode can remove the moisture on the surface thereof. Even if the surface area of the absorbent is not larger than that of the oxidant electrode, the absorbent can be sequentially in contact with the entire surface of the oxidant electrode to remove the moisture of the oxidant electrode. Further, the fuel cell can include a plurality of the oxidant electrodes. In this case, the respective absorbents can be disposed for each of the oxidant electrodes. One absorbent may be disposed for the plurality of the oxidant electrodes, and moves sequentially for the respective oxidant electrodes.

The fuel cell of the present invention can further include an oxidant path formed on the surface of the oxidant electrode, and the absorbent is disposed in the oxidant path.

The fuel cell of the present invention can further include a discharge promoting section which promotes the discharge of the oxidant from the oxidant path. The discharge promoting section may be a discharge fan or an inlet fan. Thereby, the humidity in the oxidant path can be reduced and the moisture absorbed by the absorbent can be discharged outward to dry the absorbent.

The fuel cell of the present invention can further include a humidity measuring section which measures the humidity in the oxidant path. The absorbent moving section can move the absorbent in accordance with the humidity measured by the humidity measuring section. For example, the absorbent moving section can move approaching to the oxidant electrode when the humidity in the oxidant path is higher, and can move departing from the oxidant electrode when the humidity in the oxidant path is lower.

The fuel cell of the present invention can further include a switching mechanism for switching the closing or the opening of the oxidant path. The switching mechanism may be an inlet port and a discharge port disposed for opening and closing the oxidant path. In this configuration, the oxidant path can be sealed by closing the inlet port and the discharge port during the stop of the fuel cell operation.

Thereby, the drying of the solid electrolyte membrane can be prevented. Liquid fuel, when used as the fuel, is prevented to be vaporized from the oxidant electrode side after the permeation of the solid electrolyte membrane. When the oxidant path is sealed during the stop of the fuel cell operation, the humidity in the oxidant path changes due to the temperature change around the fuel cell to generate dew and condensed water on the surface of the oxidant electrode. The condensed water, if left untouched, may be frozen at a lower temperature to prevent the stable operation of the fuel cell. The fuel cell of the present invention including the absorbent can prevent the occurrence of the dew and the condensed water on the surface of the oxidant electrode, and can be stably operated unaffected by the circumstances and the operation conditions.

The fuel cell of the present invention can further include an opening adjusting section for adjusting the opening of the inlet port or the discharge port.

The fuel cell of the present invention can further include a drying section for drying the absorbent. A fan is used as the drying section. The drying section can include a heating section for heating the absorbent. The heating section can be disposed on the surface of the absorbent opposite to that in contact with the oxidant electrode. The drying section can regenerate and utilize the absorbent after the release of the moisture from the absorbent which has been absorbed by the absorbent.

The fuel cell of the present invention can further include a temperature measuring section for measuring a temperature, and the absorbent moving part moves the absorbent in accordance with the temperature measured by the temperature measuring section. The absorbent moving part moves the absorbent in accordance with the temperature change measured by the temperature measuring section.

The fuel cell of the present invention including the temperature measuring section can further include a detecting section for detecting the output of the fuel cell, a memory section for storing a reference value of output determined in accordance with the temperature, and a judging section for comparing the output detected by the detecting section with the reference value memorized in the memory section to judge whether the output reaches the reference value or not based on the temperature measured by the temperature measuring section. When the output has not reached the reference value, the absorbent moving part can move the absorbent in the direction the absorbent approaches to the oxidant electrode. Thereby, the output of the fuel can be effectively increased by the removal of the moisture deposited on the oxidant electrode surface when the output of the fuel cell is reduced because of the deposition of the moisture on the oxidant electrode surface.

The fuel cell of the present invention including the detecting section for detecting the output of the fuel cell can further include an alarm output section, and a control section for instructing the detecting section to detect the output of the fuel cell after the absorbent is moved by the absorbent moving part in the direction the absorbent approaches to the oxidant electrode, and for instructing the alarm output section to output the alarm when the output of the fuel cell is not improved. Thereby, the breakdown of the fuel cell can be detected because a person in charge of the operation can detect it when the output of the fuel cell cannot be improved even though a procedure of removing the moisture on the oxidant electrode surface has been conducted.

Further, the necessity of replacing the absorbent can be detected.

The absorbent moving part in the fuel cell of the present invention can make the absorbent move or stop in accordance with the operation or the operation stop, respectively. The absorbent moving part can make the absorbent exist in a position where the absorbent approaches to the oxidant electrode, for example, during the operation stop of the fuel cell. The absorbent can take a configuration that the oxidant electrode is blanketed thereby. Accordingly, the drying of the solid electrolyte membrane during the operation stop of the fuel cell, and the evaporation of the liquid fuel permeated from the fuel electrode can be prevented.

The fuel cell of the present invention can be the direct type in which the liquid fuel is directly supplied to the fuel electrode.

The fuel cell of the present invention can include a plurality of the oxidant electrodes disposed on a plane. In this case, the absorbent can be configured to blanket the plurality of the oxidant electrodes or to get in contact therewith sequentially.

In accordance with the present invention, a method of operating a fuel cell including a fuel electrode and an oxidant electrode is provided which includes the steps of moving an absorbent disposed on the oxidant electrode side so as to approach to the oxidant electrode, and moving the absorbent so as to depart from the oxidant electrode.

In the method of operating the fuel cell in the present invention, the absorbent is in contact with the oxidant electrode in the approaching step, and the oxidant electrode departs from a part of the absorbent in the departing step.

In the method of operating the fuel cell in the present invention, the step of moving the absorbent in the direction of approaching to the oxidant electrode can be conducted during the stop of the fuel cell operation. The step of departing the absorbent from the oxidant electrode can be conducted at the time of starting the fuel cell operation.

In the method of operating the fuel cell in the present invention, the step of moving the absorbent in the direction of approaching to the oxidant electrode can be conducted before the start of the fuel cell operation. The step of departing the absorbent from the oxidant electrode can be conducted at the time of starting the fuel cell operation.

The method of operating the fuel cell in the present invention can further include a step of drying the absorbent. The method of operating the fuel cell in the present invention can further include a step of heating the absorbent.

The method of operating the fuel cell in the present invention can further include a step of selecting the steps of moving the absorbent to approach to the oxidant electrode and of moving the absorbent to depart from the oxidant electrode depending on the operation circumstances.

The method of operating the fuel cell in the present invention can further include a step of measuring a temperature, and a step of selecting the steps of moving the absorbent to approach to the oxidant electrode and of moving the absorbent to depart from the oxidant electrode in accordance with the temperature measured in the temperature measuring step.

The fuel cell can further include an oxidant path through which the oxidant is supplied to the oxidant electrode, and the absorbent may be disposed in the oxidant path. The method can further include a step of measuring humidity in the oxidant path, and a step of selecting the steps of moving the absorbent to approach to the oxidant electrode and of moving the absorbent to depart from the oxidant electrode in accordance with the humidity measured in the humidity measuring step.

The method of operating the fuel cell in the present invention can further include a step of detecting an output of the fuel cell, and a step of selecting the steps of moving the absorbent to approach to the oxidant electrode and of moving the absorbent to depart from the oxidant electrode in accordance with the output detected in the output detecting step.

The method of operating the fuel cell include the step of detecting the output of the fuel cell in the present invention can further include a step of judging whether the detected output reaches the reference value or not after the step of moving the absorbent to approach to the oxidant electrode followed by the detection of the output of the fuel cell, and a step of outputting an alarm when the output is not improved in the judging step.

The fuel cell of the present invention can further include the oxidant path through which the oxidant is supplied to the oxidant electrode. The method can further include a step of promoting the discharge of the oxidant from the oxidant path.

The fuel cell of the present invention can further include an inlet port and a discharge port which are openable and closable, and the oxidant path through which the oxidant is supplied to the oxidant electrode, and the absorbent may be disposed in the oxidant path. The method can further include a step of adjusting the degree of opening of the inlet port or the discharge port.

EFFECT OF INVENTION

As described, in accordance with the present invention, the fuel cell can be provided which supplies the stable power without being affected by the circumstances and the operation conditions because of the configuration in which the moisture generated on the oxidant electrode can be efficiently removed. Further, in accordance with the present invention, the fuel cell can be provided which has higher reliability and a longer period of life.

BEST MODE FOR IMPLEMENTING INVENTION

Embodiments of the present invention will be described referring to the annexed drawings. The detailed description is appropriately omitted by attaching the same numerals to the same components in all the drawings.

The fuel cell in Embodiments of the present invention can be applied to a small electronic device such as cellular phone, portable personal computer including laptop, PDA (Personal Digital Assistant), cameras, navigation system and portable music player.

First Embodiment

FIG. 1 is a sectional block diagram schematically showing the configuration of a fuel cell of this Embodiment.

The fuel cell includes a plurality of unit cells 101. The respective unit cells 101 include a fuel electrode 102, an oxidant electrode 108 and a solid electrolyte membrane 114 sandwiched thereby. Fuel 124 is supplied to the fuel electrode 102 and oxidant 126 is supplied to the oxidant electrode 108 to generate power in accordance with an electrochemical reaction. The unit cell 101 is a direct-type fuel cell in which liquid fuel is supplied to the fuel electrode 102. The fuel 124 may be organic liquid fuel such as methanol, ethanol, dimethylether or other alcohols; and liquid hydrocarbon such as cycloparaffin. The organic liquid fuel may be an aqueous solution. Ordinarily, air is used as the oxidant 126, but oxygen gas may be supplied.

The fuel cell includes a fuel path 310 supplying the fuel 124 to the fuel electrode 126, and an oxidant path 312 supplying the oxidant 126 to the oxidant electrode 108. An inlet port 339 and a discharge port 340 are equipped on the oxidant path 312.

In this Embodiment, the plurality of the unit cells 101 are electrically connected in series to constitute two pairs of cells disposed on planes. In the two pairs of cells, the fuel electrodes 102 are disposed opposing to each other and sandwiching the fuel path 310. The oxidant path 312 is formed on the oxidant electrode 108 side outside of the cells disposed on the plane.

The fuel cell further includes an absorbent 1051 disposed in the oxidant path 312, an absorbent moving part 1053 for moving the absorbent 1051, and a discharging fan 1055 for discharging oxidant 126 in the oxidant path 312 through the discharge port 340. The absorbent moving part 1053 movably supports the absorbent 1051 in the approaching direction and the departing direction to and from the oxidant electrode 108.

In this Embodiment, the absorbent 1051 may be a sheet having a first surface opposing to the oxidant electrode surface when it moves in the direction of approaching to the oxidant electrode 108. The absorbent 1051 can absorb the moisture deposited on the oxidant electrode 108 surface and can be made of a material capable of releasing the absorbed moisture. Such a material includes polyester, RAYON (regenerated cellulose), NYLON (polyamide), fluorine resin, polyethylene, polypropylene, polycarbonate, polyimide, polysulfone, polysulfide, polybenzimidazole and fibers such as cotton. Porous ceramics and porous metal such as porous silica and porous alumina can be used as the above material.

The absorbent 1051 preferably has a surface area larger than that of the oxidant electrode 108 of the unit cell 101 to blanket the oxidant electrode 108 surface. Thereby, the condensed water generated on the oxidant electrode 108 can be efficiently removed. A plurality of the absorbents 1051 can be disposed in correspondence with the oxidant electrodes 108 of the plurality of the unit cells. The absorbent can be jointly owned by several oxidant electrodes 108. In this case, the absorbent moving part 1053 moves in the vertical direction for approaching and departing the absorbent to and from the oxidant electrode 108 in addition to in the horizontal direction.

In the present Embodiment, the absorbent moving part 1053 moves in the vertical direction with respect to the oxidant electrode 108 such that the first surface of the absorbent 1051 is departed from the oxidant electrode 108 surface after being in contact with the oxidant electrode 108 surface, and moves in the horizontal direction with respect to the oxidant electrode 108 such that the first surface of the absorbent 1051 sequentially blankets the respective surfaces of the oxidant electrodes 108 of the unit cells 101 disposed on the plane. Thereby, the condensed water can be removed by moving the absorbent 1051 to the oxidant electrode 108 surface, when required.

In another example, the surface area of the first surface of the absorbent 1051 may be smaller than that of the oxidant electrode 108 of the unit cell 101. In this case, the absorbent moving part 1053 moves the absorbent 1051 such that the absorbent sequentially blankets all the respective surfaces of the oxidant electrodes 108.

In a further example, the surface area of the first surface of the absorbent 1051 may be that such that the first surface blankets all the surfaces of the oxidant electrodes 108 of the unit cells 101 at once. In this case, the absorbent moving part 1053 may be configured to move the absorbent 1051 only in the vertical direction.

The discharging fan 1055 discharges humidity released from the absorbent 1051 together with the oxidant 126 in the oxidant path 312. Thereby, the moisture release from the absorbent 1051 can be promoted. A supply fan (not shown) can be provided on the inlet port 339 of the oxidant path 312. Thereby, the moisture release from the absorbent 1051 can be promoted because the oxidant 126 containing no humidity can be supplied into the oxidant path 312.

The mechanism of moving the absorbent 1051 by the absorbent moving part 1053 will be described. FIG. 2 shows an example of the lifting and descending mechanism of the absorbent of the fuel cell in accordance with the present Embodiment.

The absorbent moving part 1053 includes support rods 1071, rotation support sections 1073, a motor 1075, a pair of pulleys 1077 and 1078 and a power transmission belt 1079. In the drawing, black sections and full lines indicate the state that the first surface of the absorbent 1051 is in contact with or approaches to the oxidant electrode 108 surface, and hatched sections and dotted lines indicate the state that the first surface of the absorbent 1051 is departed from the oxidant electrode 108 surface.

The support rod 1071 has one end rotatably pivoted around a rotation axis 1072 mounted on both ends of the absorbent 1051, and the other end mounted on a rotation axis (not shown) of the rotation support section 1073 and rotatably supported around the rotation support section 1073. The support rod 1071 rotates around the rotation axis of the rotation support section 1073 by the rotation of the rotation support section 1073, and the absorbent supported by the support rod 1071 rotates around the rotation axis 1072 following the movement of the support rod 1071. Then, as shown herein, the first surface of the absorbent 1051 moves in the vertical direction with respect to the oxidant electrode 108 surface.

The rotation support section 1073 has a band wheel 1074 equipped at least one end of the rotation axis pivoted to a bearing (not shown).

A pulley 1077 mounted on one end of the rotation axis (not shown) of the motor 1075 rotates with the motor. The power transmission belt 1079 is connected to the pulley 1075 such that the rotation of the pulley 1075 rotates a pulley 1078 mounted on the opposite side around a rotation axis (not shown) pivoted to a bearing not shown.

The power transmission belt 1079 is connected to the band wheel 1074 of the rotation support section 1073 between the pulleys 1077 and 1078. Thereby, the rotation of the motor 1075 is transmitted to the band wheel 1074 of the rotation support section 1073 through the power transmission belt 1079 so that the rotation axis of the rotation support section 1073 rotates to move the absorbent 1051.

Then, the horizontal movement of the absorbent 1051 with respect to the oxidant electrode 108 surface will be described.

Though not shown in the drawings, the absorbent moving part 1053 further includes a second band wheel mounted on the rotation axis of the rotation support section 1073, a second motor (not shown) different from the motor 1075, a pair of pulleys (not shown) mounted on the second motor, and a power transmission belt (not shown) connected to the pulleys. In this configuration, the rotation of the second motor is transmitted to the second band wheel through the power transmission belt. The bearing of the rotation support section 1073 may be a rail supporting the rotation axis of the rotation support section 1073 such that the absorbent 1051 can move in the horizontal direction with respect to the oxidant electrode 108 surface. When the motor 1075 rotates, the position of the rotation axis of the rotation support section 1073 is fixed. When the second motor rotates, the rotation axis of the rotation support section 1073 is moveably supported. Thereby, the rotation of the second motor is transmitted to the second band wheel, and the rotation of the second band wheel moves the absorbent 1051 in the horizontal direction with respect to the oxidant electrode 108 surface.

While the absorbent 1051 moves in the horizontal direction as described above in the present Embodiment, the movement is not restricted thereto, and various arrangements is possible. For example, the absorbent moving part 1053 can be configured to move the absorbent 1051 in the horizontal and two-dimensional direction. Thereby, when a plurality of the oxidant electrodes 108 are disposed on a plane in matrix, the moisture on the plurality of the oxidant electrodes 108 can be sequentially absorbed and removed by the absorbent.

Also in the present invention, though the rotation of the pulley 1077 for lifting and descending the absorbent 1051 is conducted by the motor, the rotation is not restricted thereto. A mechanism of manually rotating the pulley 1077 can be mounted.

The rotation of the respective motors can be controlled by a control section not shown herein. Also, the rotation of the respective motors can be manually controlled by an operation section not shown herein.

When the absorbent 1051 is in the shape of a thin fabric sheet, the absorbent 1051 may be adhered to a first surface of a support plate 1080 as shown in FIG. 3.

As described, the fuel cell can be provided in accordance with the present Embodiment which prevents the reduction of the power generation efficiency without the influence of the circumstance and the operation conditions because the condensed water produced by the dew on the oxidant electrode surface can be directly removed. The condensed water can be removed by moving the absorbent to the surface of the oxidant electrode when required. The power can be stably supplied without reducing the supply efficiency of the oxidant to the oxidant electrode because the absorbent does not remain in contact with the oxidant electrode surface.

Second Embodiment

FIG. 4 is a sectional block diagram schematically showing a fuel cell of the present Embodiment.

The fuel cell of the present Embodiment can further include a shutter 1001 opening and closing the inlet port 339 of the oxidant path 312 and a shutter 1002 opening and closing the discharge port 340 of the oxidant path 312. The oxidant path 312 of the present Embodiment can be sealed by closing the inlet port 339 and the discharge port 340 during the stop of the fuel cell operation.

Thereby, the vaporization of the fuel from the oxidant electrode 108 side after the permeation through the solid electrolyte membrane 114, and the drying of the solid electrolyte membrane 114 can be prevented.

The shutters 1001 and 1002 of the present Embodiment are disposed so as to adjust the degree of opening of the inlet port 339 and the discharge port 340. Thereby, the vaporization of the fuel from the oxidant electrode 108 side after the permeation through the solid electrolyte membrane 114 can be prevented by closing the inlet port 339 and the discharge port 340 or reducing the degree of opening thereof. Further, a flow rate of the oxidant flowing in the oxidant path can be controlled by adjusting the degree of opening of the inlet port 339 and the discharge port 340 of the oxidant path 312. The occurrence of the dew production together with the fuel vaporization and the solid electrolyte membrane 114 drying can be prevented by suitably adjusting the flow rate of the oxidant in the oxidant path. Also in the fuel cell operation, the reduction of the power generation efficiency can be prevented by decreasing the flow rate of the oxidant to the oxidant electrode 108 side such that the oxidant electrode 108 is air-cooled by the oxidant.

Though not shown herein, the fuel cell can include the discharge fan 1055 as shown in FIG. 1.

The fuel cell can further include a drying section for drying the absorbent. The drying section can include a heating section for heating the absorbent. The heating section will be described in detail. Thereby, the water absorbed by the absorbent 1051 can be efficiently expelled.

As described, in accordance with the fuel cell of the present Embodiment, the humidity in the oxidant path 312 can be adjusted by controlling the opening and the closing of the shutters 1001 and 1002 depending on the circumstance and the operation conditions, and the condensed water produced by the dew on the oxidant electrode 108 surface can be removed by the absorbent 1051. Accordingly, the fuel cell can be provided which can prevent the reduction of the power generation efficiency without being affected by the circumstance and the operation conditions.

Third Embodiment

FIG. 5 is a schematic block diagram schematically showing a fuel cell of the present Embodiment.

The fuel cell of the present Embodiment has a configuration similar to that of the second Embodiment shown in FIG. 4. The fuel cell of the present Embodiment includes a control section 1057 for controlling the absorbent moving part 1053 and the discharge fan 1055. The control section can also control the opening and the closing of the shutters 1001 and 1002 of FIG. 4. The control section 1057 is a CPU (Central Processing Unit) or an IC (Integrated Circuit) which is programmed in advance and operates in accordance with procedures memorized in a memory device (not shown). A plurality of the unit cells 101 are indicated as a unit cell group 1000 of the fuel cell.

The operation of the fuel cell having the configuration will be described by using FIG. 6 which is a flow chart showing an example of operations during the stop of the fuel cell of the present Embodiment.

When the fuel cell is activated (YES in S101), whether the absorbent 1051 is in contact with the oxidant electrode 108 surface or not is judged (S102). When the absorbent is not in contact with the oxidant electrode 108 surface (NO in S102), the absorbent moving part 1053 moves the absorbent 1051 toward the oxidant electrode 108 surface in the vertical direction so that the first surface of the absorbent 1051 is in contact with the oxidant electrode 108 surface (S103). Thereby, the moisture on the oxidant electrode 108 surface is absorbed by the absorbent 1051. Thereafter, the absorbent moving part 1053 moves the absorbent 1051 with respect to the oxidant electrode 108 surface in the vertical direction so that the first surface of the absorbent 1051 is departed from oxidant electrode 108 surface (S104). When the absorbent 1051 is in contact with the oxidant electrode 108 surface (S103) in the step 102 (YES in S102), the step 104 is conducted by omitting the step 103.

The step 103 and the step 104 are sequentially conducted while the absorbent 1051 is moved on all the oxidant electrode 108 surfaces of a plurality of the unit cells in the horizontal direction with respect to the oxidant electrode 108 surface.

Then, the discharge fan 1055 is driven (S105) to start the power generation of the fuel cell (S106).

Such a processing is efficient for operating the fuel cell even if the moisture is deposited on the oxidant electrode 108 surface during the stop of the fuel cell operation because the moisture can be removed before the start of the operation.

Although the absorbent 1051 is exemplified to be in contact with the oxidant electrode 108 surface before the start of the operation, the processing of the steps S103 and S104 in FIG. 6 can be repeated every specified time during the operation stop of the fuel cell.

The lifting and descending mechanism of the absorbent 1051 by the absorbent moving part 1053 with respect to the oxidant electrode 108 of the present Embodiment can be similar to that described in the first Embodiment.

As described, the fuel cell can be provided in accordance with the present Embodiment which prevents the reduction of the power generation efficiency without the influence of the circumstance and the operation conditions because the condensed water produced by the dew on the oxidant electrode surface can be directly removed. The condensed water can be removed by moving the absorbent to the surface of the oxidant electrode when required. The power can be stably supplied without reducing the supply efficiency of the oxidant to the oxidant electrode because the absorbent does not remain in contact with the oxidant electrode surface.

FIG. 7 is a schematic block diagram schematically showing a fuel cell of the present Embodiment.

The fuel cell of the present Embodiment has a configuration similar to that of the second Embodiment shown in FIG. 4. The fuel cell of the present Embodiment includes a thermometer 1008 measuring a temperature in the oxidant path. Although the thermometer 1008 is exemplified to measure the temperature in the oxidant path herein, the thermometer 1008 can be disposed to measure the internal and external temperatures of the fuel cell. The thermometer 1008 can take various arrangements. For example, it can be disposed in the oxidant path 312, on the fuel cell surface, a circulation path of discharge gas (not shown), or outside of the fuel cell. The fuel cell can includes a plurality of the thermometers 1008 which are disposed on various places. The temperature measured by the thermometer 1008 is input to a judging section 1061. A temperature sensor such as thermocouple, resistance temperature sensor, thermistor, IC temperature sensor, magnetic temperature sensor, thermopile and pyroelectric temperature sensor can be used for the thermometer 1008.

The fuel cell of the present Embodiment further includes a hygrometer 1009 measuring humidity in the oxidant path 312. The humidity measured by the hygrometer is input to the judging section 1061.

The fuel cell further includes an ampere-meter 1058 for measuring a current value of the fuel cell in order to detect the output of the fuel cell, a voltmeter 1059 for measuring an output voltage and a memory 1063 for storing reference values at specified temperatures for monitoring the detected output of the fuel cell.

The judging section 1061 judges whether or not the output voltage measured by the voltmeter reaches the reference value based on the reference value of the output voltage memorized in the memory 1063 at the temperature measured by the thermometer 1008. The judging section 1061 also judges whether or not the current is maintained constant based on the current value measured by the ampere-meter 1058. The control section 1057 controls the fan 1055 and the absorbent moving part 1053 for making the current value constant.

The fuel cell can further include an alarm output section 1065 for externally informing the abnormal condition of the fuel cell output. The alarm output section 1065 can output the alarm to, for example, a display or a speaker. The output may be analogue or digital.

FIG. 8 is a flow chart showing an example of the operation of the fuel cell of the present Embodiment. The processing of the fuel cell during the operation will be described.

The judging section 1061 judges whether or not the output voltage of the fuel cell is below the reference value memorized in the memory 1063 at its temperature based on the temperature measured by the thermometer 1008 and the output voltage of the fuel cell measured by the voltmeter 1059 (S111). When the output voltage of the fuel cell is below the reference value (YES in S111), the absorbent moving part 1053 moves the absorbent 1051 in the vertical direction so that the first surface of the absorbent 1051 is in contact with the oxidant electrode 108 surface (S112). After the moisture on the oxidant electrode 108 surface is absorbed by the absorbent, the absorbent moving part 1053 moves the absorbent 1051 in the vertical direction so that the absorbent 1051 is departed from the oxidant electrode 108 surface (S113).

Thereby, when the output voltage of the fuel cell is below the reference value, the moisture deposited on the oxidant electrode 108 surface can be removed so that the fuel cell can be operated efficiently.

FIG. 9 is a flow chart showing another example of the operation of the fuel cell of the present Embodiment.

The judging section 1061 judges whether or not the output voltage of the fuel cell is below the reference value memorized in the memory 1063 at its temperature based on the temperature measured by the thermometer 1008 and the output voltage of the fuel cell measured by the voltmeter 1059 (S121). When the output voltage of the fuel cell is below the reference value (YES in S121), the control section 1057 judges whether or not the number of the judgments in the step 121 is below a specified number (n). (S122). When the number of the judgments in the step 121 is below the specified number (YES in S122), the absorbent moving part 1053 moves the absorbent 1051 in the vertical direction so that the first surface of the absorbent 1051 is in contact with the oxidant electrode 108 surface (S123). After the moisture on the oxidant electrode 108 surface is absorbed by the absorbent, the absorbent moving part 1053 moves the absorbent 1051 in the vertical direction so that the absorbent 1051 is departed from the oxidant electrode 108 surface (S124). After returning to the step 121 again, the judging section judges whether or not the output voltage of the fuel cell measured by the voltmeter 1059 is below the reference value memorized in the memory 1063.

On the other hand, when the number of the judgments in the step 121 is the specified number or more in the step 122 (NO in S122), the alarm output section 1065 outputs an alarm informing that the fuel cell output has not been improved (S125).

Thereby, when the fuel cell output has not been improved even after the procedures of repeatedly removing the moisture on the oxidant electrode 108 surface by the absorbent 1051, this result can be informed to an administrator so that he knows the abnormality of the fuel cell. When the absorbent is required to be replaced such that too much moisture is deposited on the absorbent 1051 or the absorbing ability of the absorbent is lowered, the administrator can get the information about the absorbent 1051.

Fifth Embodiment

The fuel cell of the present Embodiment also has a configuration similar to that of the first Embodiment. The configuration of the lifting and descending mechanism of the present Embodiment is different from that of the first Embodiment.

FIG. 10 shows one example of the lifting and descending mechanism for the absorbent in the fuel cell of the present Embodiment.

The fuel cell includes the absorbent 1051 adhered on the surface of the outer wall 1081 of the oxidant path 312, a motor 1083 mounted outside of the outer wall 1081 of the oxidant path 312, an eccentric cam 1085 fixed on one end of a rotation axis 1084 of the motor 1085 and rotating with the motor 1085, and a support spring 1089 mounted between the inner wall of the fuel vessel 1087 accommodating the fuel cell and the outer surface of the outer wall 1081 of the oxidant path 312.

The absorbent 1051 of the present Embodiment has the shape and the size so as to blanket the respective surfaces of the oxidant electrodes 108 of a plurality of the unit cells 101.

As shown in FIG. 11, the fuel cell can further include the heating section 1091 mounted on the other surface of the absorbent 1051. The heating section 1091 may be a heater. Thereby, when the condensed water generated on the oxidant electrode 108 is frozen at a lower temperature, it can be defrosted and the water can be removed by the absorption into the absorbent 1051. The moisture contained in the absorbent 1051 can be dried.

While the heating section 1091 is mounted on the inner part of the outer wall 1081 of the oxidant path 312 in FIG. 11, the mounting is not restricted thereto, and the heating section can be mounted on a position corresponding to that of the absorbent 1051 on the outer part of the outer wall 1081 of the oxidant path 312. The heating section is controlled by the controlled section not shown herein depending on the circumstance and the operation conditions.

The operation of the lifting and descending mechanism for the absorbent having the above configuration will be described referring to FIG. 10.

When the motor 1083 rotates, the eccentric cam 1085 rotates such that the eccentric cam 1085 presses the outer wall 1081 of the oxidant path 312 toward the inner part of the oxidant path 312. Thereby, the first surface of the absorbent 1051 comes in contact with the oxidant electrode 108 surface. When the motor 1083 reversely rotates, the eccentric cam 1085 also reversely rotates to depart the absorbent from the outer wall of the oxidant path 312. At this time, the outer wall of the oxidant path 312 is returned to its original position by the tension of the support spring 1089 supporting the outer wall of the oxidant path 312. Thereby, the first surface of the absorbent 1051 is departed from the oxidant electrode 108 surface.

As described, since the first surface of the absorbent 1051 can be in contact with or departed from the oxidant electrode 108 surface in the fuel cell of the present Embodiment, the condensed water on the oxidant electrode 108 surface can be removed, when required, to provide the fuel cell which can prevent the reduction of the power generation efficiency without the influence of the circumstances and the operation conditions.

While the eccentric cam 1085 for lifting and descending the absorbent 1051 is rotated by the motor in the present Embodiment, the rotation is not restricted thereto, and a mechanism can be provided in which the eccentric cam 1085 is manually rotated. Or the lifting and descending mechanism other than the eccentric cam 1085 may be employed.

The rotations of the respective motors can be controlled by a control section not shown. The rotations of the respective motors can be manually controlled by an operation section not shown.

The mechanism of lifting and descending the absorbent in the present Embodiment can be used in the second to fourth Embodiments.

The present invention has been described in accordance with the Embodiments. These Embodiments are only for examples, and various modifications or alternations can be easily made therefrom by those skilled in the art.

The absorbent 1051 can be made of a water-absorbing polymer. The fuel cell can be configured by using the removable absorbent 1051 made of the above material. In this case, the absorbent 1051 can be configured by a sheet prepared by sandwiching synthetic fiber made of the water-absorbing polymer or mixed powder of powdery water-absorbing polymer and cotton between cardboards followed by the pressing. As the water-absorbing polymer, sodium acrylate-related polymer such as sodium polyacrylate; acrylamide-related polymer such as polyacrylamide; poly-N-vinyl acetamide, poly-N-vinyl formamide, polyvinyl alcohol, polyethylene oxide, polyethylene glycol, poly-N-vinyl pyrrolidone, bridged acrylate copolymer, polyester, polysaccharides, agar, gelatin, starch, styrene-divinylbenze-based water-absorbing polymer and copolymers of these materials are exemplified. These can be used singly or in combination.

A desiccant such as silica gel can be used as the absorbent 1051. Such a material can remove the moisture deposited on the oxidant electrode 108 surface even when the absorbent 1051 is not in contact with the oxidant electrode 108 surface.

When the absorbent 1051 is configured to blanket all the surfaces of the oxidant electrodes 108 of the unit cells 101 at once, the absorbent 1051 blankets the oxidant electrodes 108 during the stop of the fuel cell operation. Thereby, the drying of the solid electrolyte membrane 114 and the vaporization of the fuel during the stop of the fuel cell operation can be prevented.

While the organic liquid fuel is exemplified as the fuel in the preceding Embodiments, the present invention can be applied to the fuel cell using hydrogen as the fuel.

Since the above Embodiments and Example are described only for examples, the present invention is not limited to the above Embodiments and various modifications or alternations can be easily made therefrom by those skilled in the art without departing from the scope of the present invention.

Figure 1:
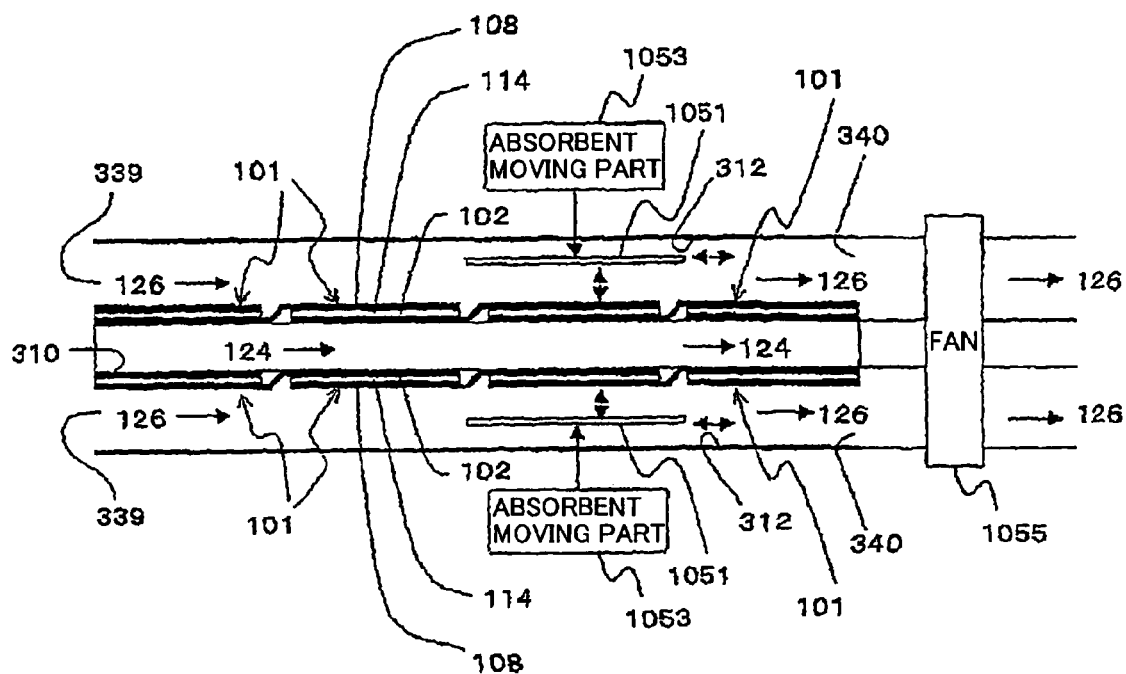
FIG. 1 shows a schematic structure of an electrode sheet configuring a fuel cell of the first Embodiment.
Figure 2:
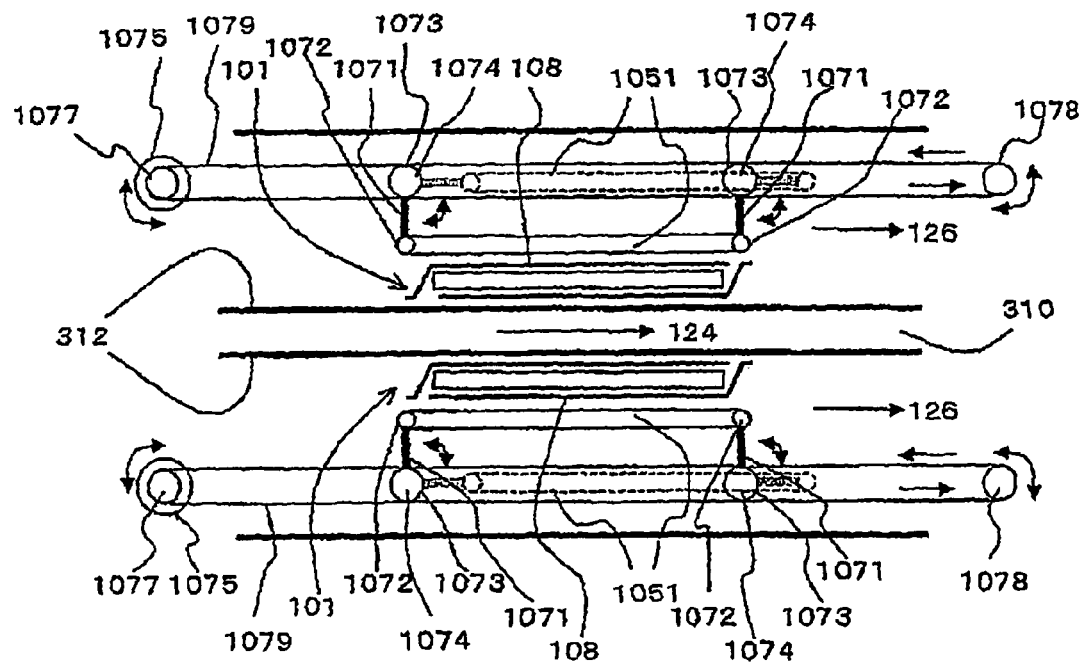
FIG. 2 is a view showing an example of a lifting and descending mechanism for an absorbent of the fuel cell in FIG. 1
Figure 3:
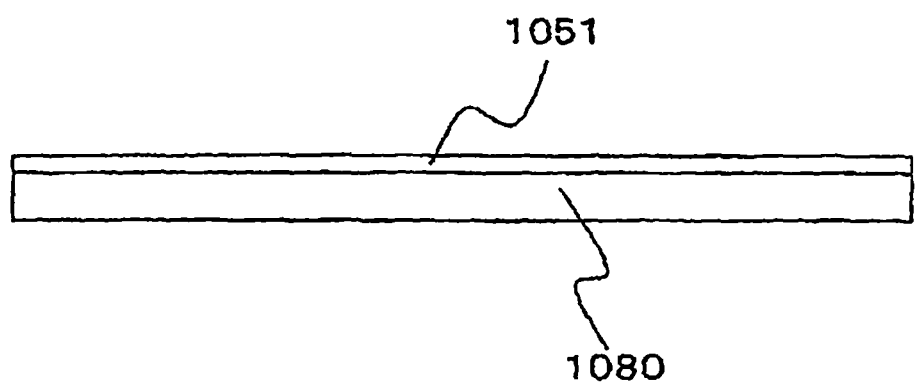
FIG. 3 is a view showing an example of the absorbent of the fuel cell in FIG. 2.
Figure 4:
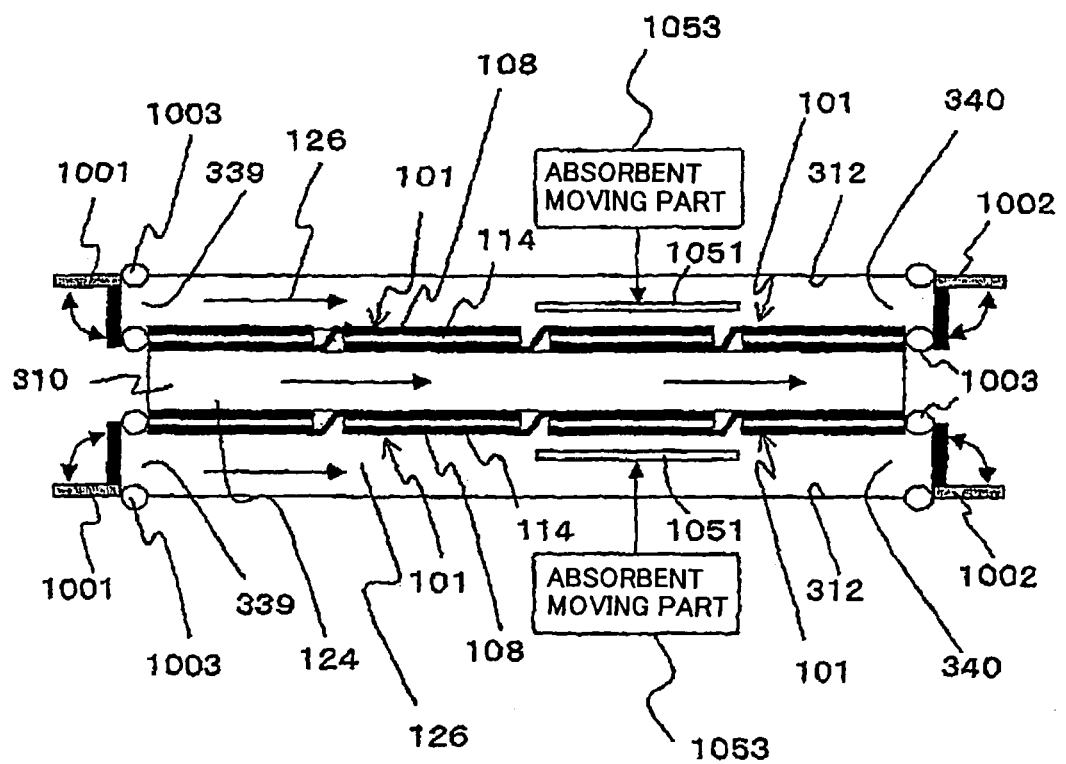
FIG. 4 is a sectional block diagram schematically showing a configuration of a fuel cell of the second Embodiment.
Figure 5:
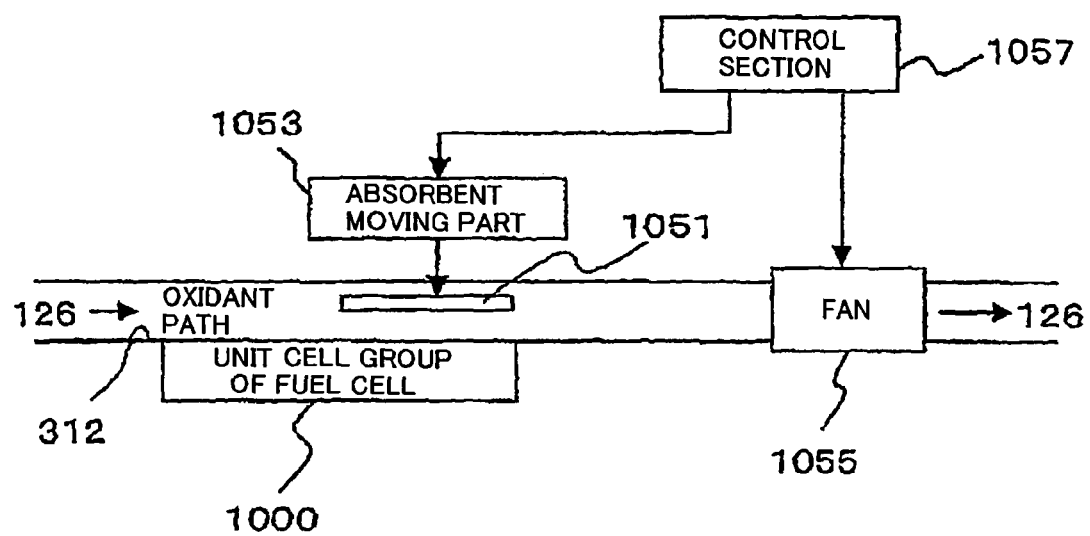
FIG. 5 is a schematic block diagram schematically showing a configuration of a fuel cell of the third Embodiment.
Figure 6:
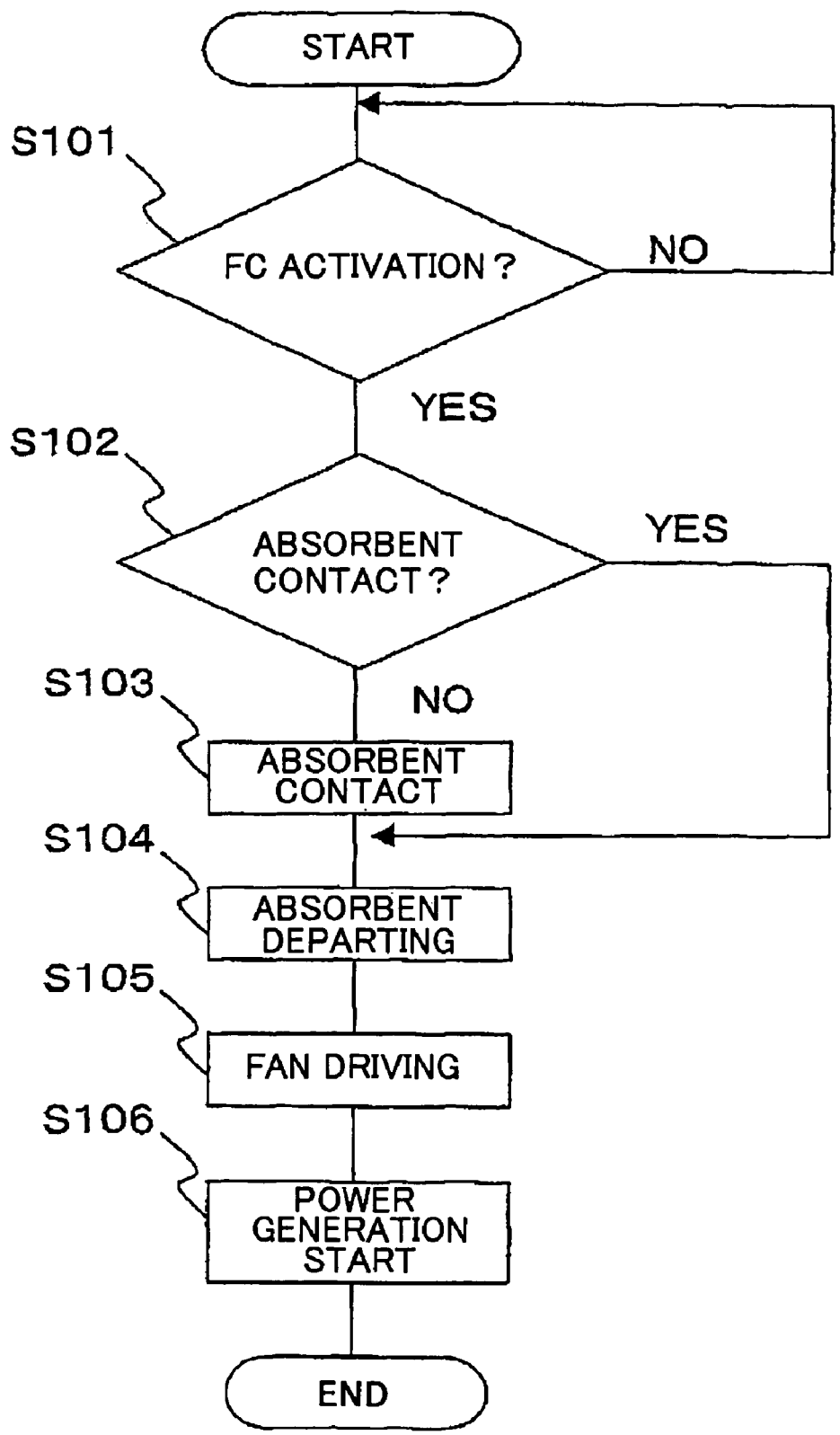
FIG. 6 is a flow chart showing an example of an operation of the fuel cell of FIG. 5 during operation stop.
Figure 7:
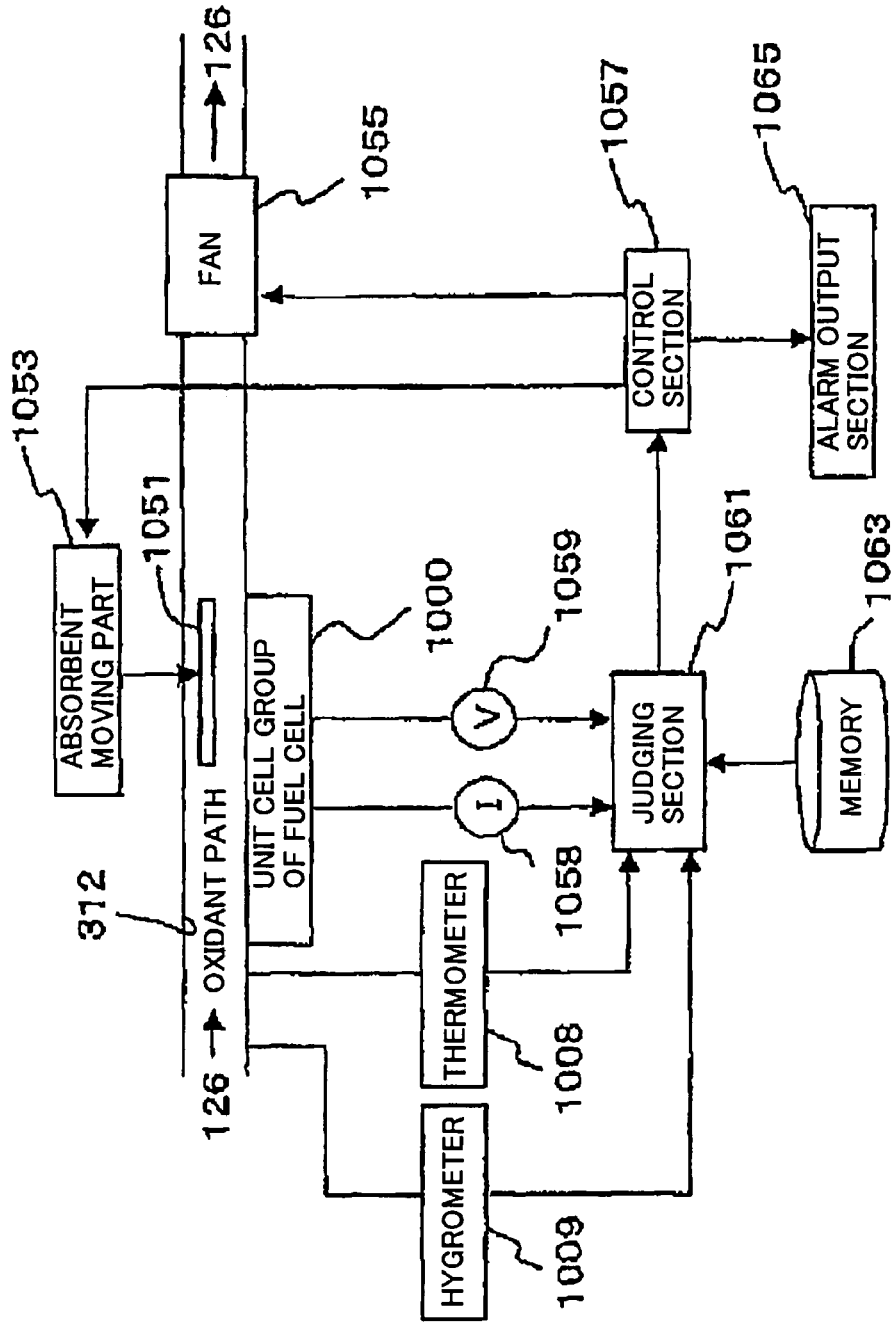
FIG. 7 is a schematic block diagram schematically showing another configuration of the fuel cell in FIG. 5.
Figure 8:
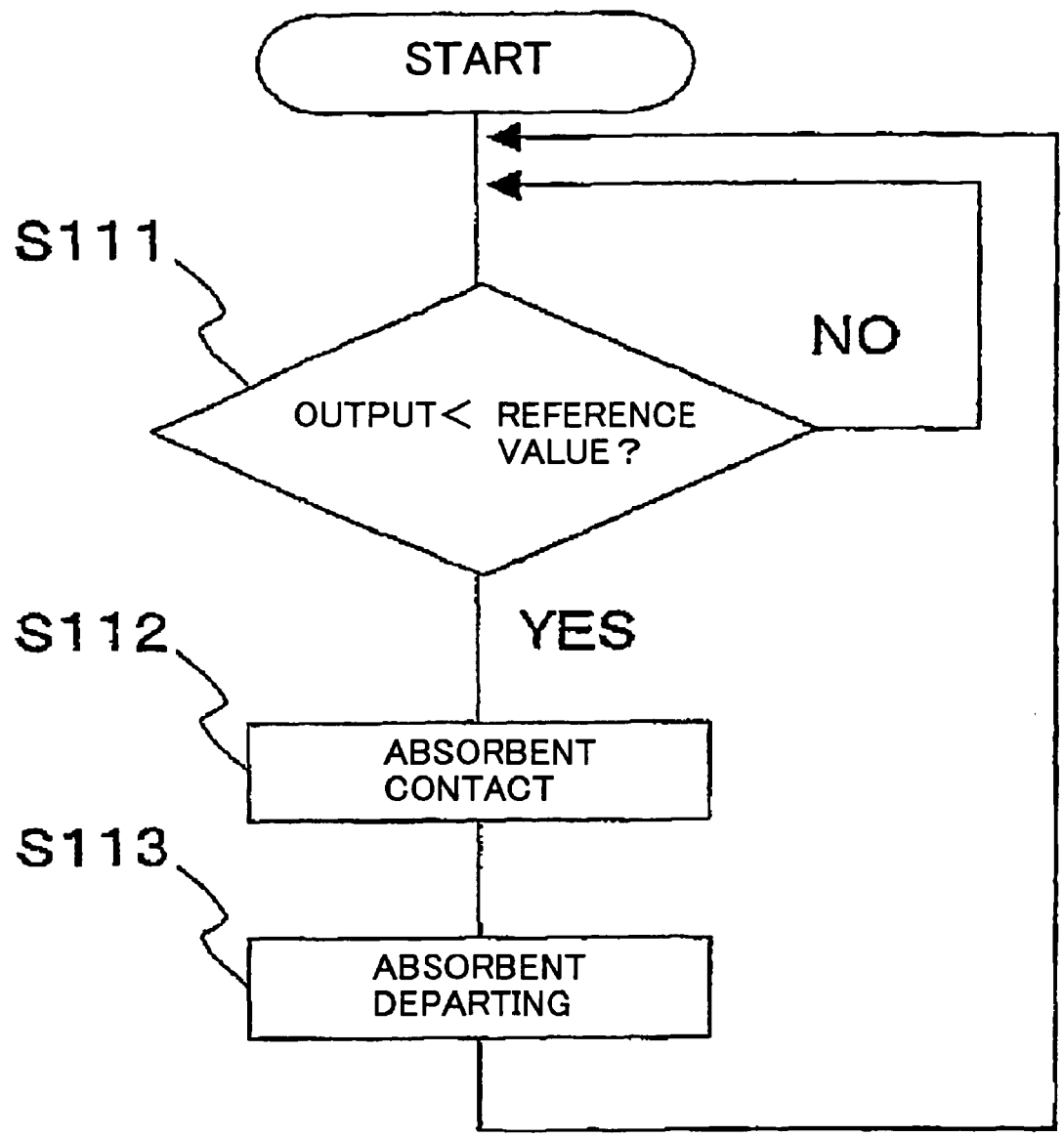
FIG. 8 is a flow chart showing an example of an operation of the fuel cell of FIG. 7 during operation.
Figure 9:
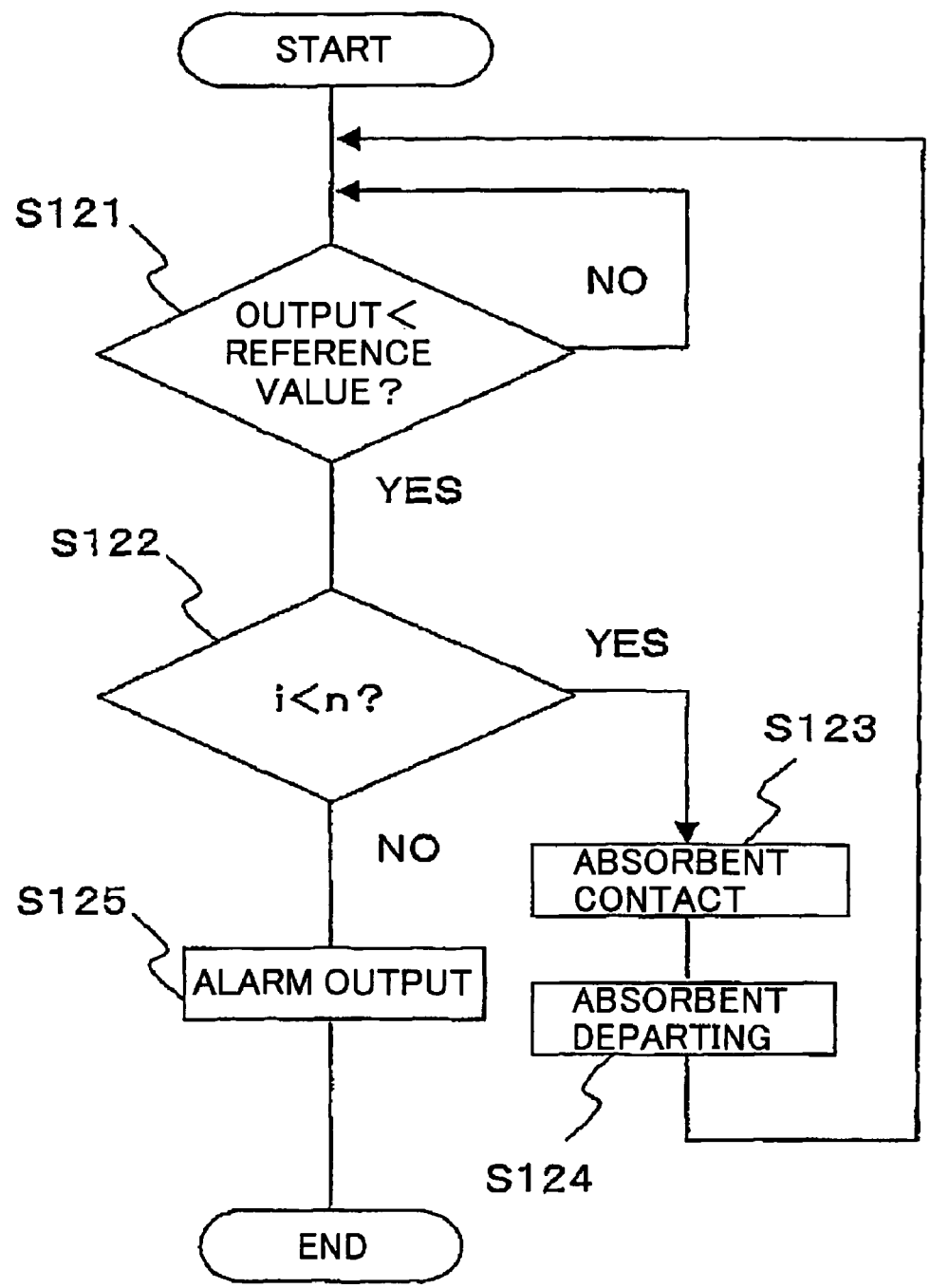
FIG. 9 is a flow chart showing another example of an operation of the fuel cell of FIG. 7 during operation.
Figure 10:
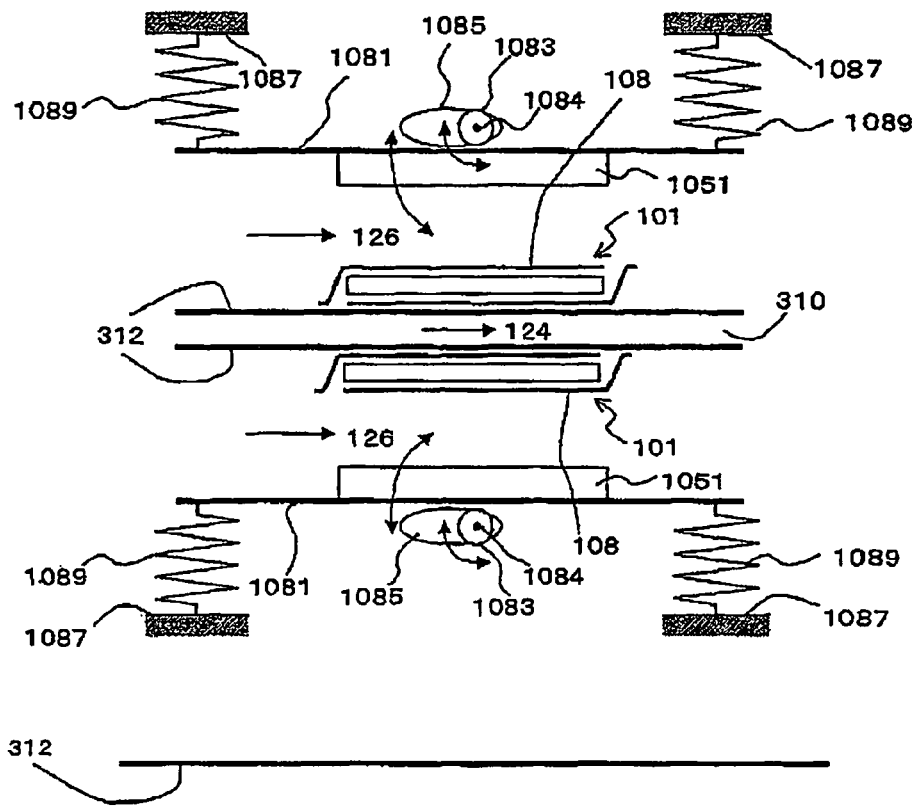
FIG. 10 is a view showing another example of a lifting and descending mechanism for an absorbent of the fuel cell in the fifth Embodiment.
Figure 11:
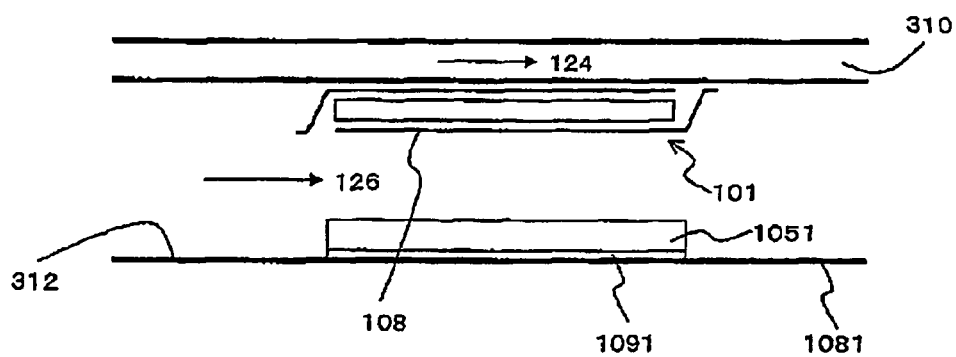
FIG. 11 is a view showing another configuration of the fuel cell in FIG. 10.

DESCRIPTION OF SYMBOLS 101 unit cell
102 fuel electrode
108 oxidant electrode
114 solid electrolyte membrane
124 fuel
126 oxidant
310 fuel path
312 oxidant path
339 inlet port
340 discharge port
1001 shutter
1002 shutter
1008 thermometer
1009 hygrometer
1051 absorbent
1053 absorbent moving part
1055 discharging fan
1057 control section
1058 ampere-meter
1059 voltmeter
1061 judging section
1063 memory
1065 alarm output section
1071 support rod
1072 rotation axis
1073 rotation support section 1074 band wheel
1075 motor
1077 pulley
1078 pulley
1079 power transmission belt
1080 support plate
1081 outer wall
1083 motor
1084 rotation axis
1085 eccentric cam
1087 vessel
1089 support spring
1091 heating section

The invention claimed is:

1. A fuel cell comprising:
a fuel electrode and an oxidant electrode;
an absorbent sheet disposed in an oxidant path and sandwiched between the oxidant electrode and a separator plate; and
an absorbent moving part disposed in the oxidant path and sandwiched between the oxidant electrode and the separator plate, the absorbent moving part movably supporting the absorbent sheet in a direction such that the absorbent sheet approaches to and departs from a vicinity of an oxidant inlet.

2. The fuel cell as claimed in claim 1, wherein the absorbent moving part moves the absorbent sheet between a position where at least part of the absorbent sheet is in contact with the oxidant electrode and another position where said at least part of the absorbent sheet is departed from the oxidant electrode.

3. The fuel cell as claimed in claim 1, wherein the absorbent moving part supports the absorbent sheet such that the absorbent sheet is disposed opposing to the oxidant electrode surface when the absorbent sheet is moved in a direction approaching to the oxidant electrode.

4. The fuel cell as claimed in claim 1, further comprising the oxidant path being on the oxidant electrode's surface in which the absorbent sheet is disposed.

5. The fuel cell as claimed in claim 4, further comprising a discharge promoting section for promoting discharge of the oxidant in the oxidant path.

6. The fuel cell as claimed in claim 4, further comprising a humidity measuring section for measuring humidity in the oxidant path, wherein the absorbent moving part moves the absorbent sheet in accordance with the humidity measured by the humidity measuring section.

7. The fuel cell as claimed in claim 4, further comprising a switching mechanism for switching closing or opening of the oxidant path.

8. The fuel cell as claimed in claim 1, further comprising a drying section for drying the absorbent sheet.

9. The fuel cell as claimed in claim 1, further comprising a temperature measuring section for measuring a temperature in the oxidant path, wherein the absorbent moving part moves the absorbent sheet in accordance with the temperature measured by the temperature measuring section.

10. The fuel cell as claimed in claim 1, further comprising:
a temperature measuring section for measuring a temperature;
a detecting section for detecting an output of the fuel cell;
a memory section for storing a reference value of the output determined in accordance with the temperature; and
a judging section for comparing the output detected by the detecting section with the reference value stored in the memory section to judge whether or not the output reaches the reference value based on the temperature measured by the temperature measuring section,
wherein the absorbent moving part moves the absorbent sheet in a direction such that the absorbent sheet approaches to the oxidant electrode, if the output has not reached the reference value.

11. The fuel cell as claimed in claim 1, further comprising:
a detecting section for detecting an output of the fuel cell;
an alarm output section; and
a control section for instructing the detecting section to detect the output of the fuel cell after the absorbent sheet is moved by the absorbent moving part in a direction the absorbent sheet approaches to the oxidant electrode, and for instructing the alarm output section to output the alarm if the output of the fuel cell is has not been improved.

12. The fuel cell as claimed in claim 1, wherein the absorbent moving part moves or stops the absorbent sheet in accordance with an operation or an operation stop, respectively.

13. The fuel cell as claimed in claim 1, wherein the fuel cell is a direct type in which liquid fuel is directly supplied to the fuel electrode.

14. The fuel cell as claimed in claim 1, wherein a plurality of the oxidant electrodes are disposed on a plane.

15. The fuel cell as claimed in claim 1, wherein the absorbent sheet is formed from material capable of releasing the absorbed moisture, the material being selected from the group consisting of polyester, regenerated cellulose, polyamide, fluorine resin, polyethylene, polypropylene, polycarbonate, polyimide, polysulfone, polysulfide, polybenzimidazole and cotton fibers.

16. The fuel cell as claimed in claim 1, wherein the absorbent sheet is a thin fabric sheet adhered to a surface of a support plate.

17. A fuel cell comprising:
a fuel electrode;
an oxidant electrode disposed opposing to the fuel electrode;
an absorbent sheet disposed in an oxidant path and sandwiched between the oxidant electrode and a separator plate;
an absorbent moving part disposed in the oxidant path and sandwiched between the oxidant electrode and the separator plate, the absorbent moving part movably supporting the absorbent sheet in a direction such that the absorbent sheet approaches to and departs from a vicinity of an oxidant inlet, and the absorbent moving part supports the absorbent sheet such that the absorbent sheet is disposed opposing a surface of the oxidant electrode when the absorbent sheet is moved in a direction approaching the oxidant electrode.

18. The fuel cell as claimed in claim 17, wherein the absorbent sheet is formed from material capable of releasing the absorbed moisture, the material being selected from the group consisting of polyester, regenerated cellulose, polyamide, fluorine resin, polyethylene, polypropylene, polycarbonate, polyimide, polysulfone, polysulfide, polybenzimidazole and cotton fibers.

19. The fuel cell as claimed in claim 17, wherein the absorbent sheet is a thin fabric sheet adhered to a surface of a support plate.

20. A fuel cell comprising:
a fuel electrode and an oxidant electrode;
an absorbent sheet disposed in an oxidant path and sandwiched between the oxidant electrode and a separator plate; and an absorbent moving part disposed in the oxidant path and sandwiched between the oxidant electrode and the separator plate, the absorbent moving part movably supporting the absorbent sheet,
  wherein the absorbent moving part moves the absorbent sheet between a position where at least part of the absorbent sheet is in contact with the oxidant electrode and another position where said at least part of the absorbent sheet is departed from the oxidant electrode in a direction toward an oxidant inlet.

21. The fuel cell as claimed in claim 20, wherein the absorbent sheet is formed from material capable of releasing the absorbed moisture, the material being selected from the group consisting of polyester, regenerated cellulose, polyamide, fluorine resin, polyethylene, polypropylene, polycarbonate, polyimide, polysulfone, polysulfide, polybenzimidazole and cotton fibers.

22. The fuel cell as claimed in claim 20, wherein the absorbent sheet is a thin fabric sheet adhered to a surface of a support plate.

* * * * *